US012412498B2

(12) United States Patent
Jeon et al.

(10) Patent No.: US 12,412,498 B2
(45) Date of Patent: Sep. 9, 2025

(54) OPTICAL COMPENSATING SYSTEM AND METHOD

(71) Applicant: LG Display Co., Ltd., Seoul (KR)

(72) Inventors: JaeSung Jeon, Seoul (KR); Hyeonju Park, Incheon (KR); Hyeonwoo Lee, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/529,273

(22) Filed: Dec. 5, 2023

(65) Prior Publication Data

US 2024/0257683 A1 Aug. 1, 2024

(30) Foreign Application Priority Data

Jan. 27, 2023 (KR) ........................ 10-2023-0010927

(51) Int. Cl.
*G09G 3/00* (2006.01)

(52) U.S. Cl.
CPC ......... *G09G 3/035* (2020.08); *G09G 2320/04* (2013.01)

(58) Field of Classification Search
CPC ...... G09G 3/035; G09G 3/006; G09G 3/3208; G09G 2320/04; G09G 2320/0233; G09G 2320/043; G09G 2320/0693; G09G 2330/08; G09G 2370/04
See application file for complete search history.

(56) References Cited

U.S. PATENT DOCUMENTS 8,406,562 B2 * 3/2013 Bassi .................. H04N 9/3185 348/222.1
10,878,747 B1 * 12/2020 Gao ..................... G09G 3/3233
11,316,119 B2 * 4/2022 Choi ..................... H10K 50/87
11,705,029 B1 * 7/2023 Zhang .................. G09G 3/3225 345/694
2008/0143753 A1 * 6/2008 Ou-Yang ................ G09G 3/006 345/207
2011/0193814 A1 * 8/2011 Gay ....................... G02B 30/25 345/173
2015/0116384 A1 * 4/2015 Kim ..................... G09G 3/3233 345/694
2016/0196778 A1 * 7/2016 Cha ......................... G09G 3/03 345/694
2017/0206859 A1 * 7/2017 Jun ......................... G09G 5/10
2019/0066555 A1 * 2/2019 Gu ......................... G09G 3/006
2019/0197929 A1 * 6/2019 Hsieh ..................... G09G 3/006
2021/0408158 A1 * 12/2021 Ma ....................... H10K 59/122

(Continued)

*Primary Examiner* — Christopher E Leiby
(74) *Attorney, Agent, or Firm* — Birch, Stewart, Kolasch & Birch, LLP

(57) ABSTRACT

Discussed are an optical compensating system and method. Specifically, there can be provided an optical compensating method, comprising generating initial flat data for a display panel in a flat state displaying a test image, generating initial curve data for the display panel in a curved state displaying the test image, extracting point data for a plurality of points in the initial flat data and the initial curve data, generating deviation data using the point data, generating a curve data map by applying a weight according to a curvature at each point to the deviation data, generating final curve data by applying the curve data map to the initial curve data, and generating compensation data from the final curve data.

16 Claims, 12 Drawing Sheets

(56) References Cited

U.S. PATENT DOCUMENTS

| | | | | |
|---|---|---|---|---|
| 2022/0070352 | A1* | 3/2022 | Hong | H04N 25/61 |
| 2022/0208048 | A1* | 6/2022 | Baek | G09G 3/03 |
| 2023/0222949 | A1* | 7/2023 | Lee | G09G 3/2092 345/1.3 |

* cited by examiner (a) (b)

(a)

SDM(FA) = DD(P1-P4, P6-P8) X W1
SDM(CA) = DD(P4-P6) X W2
(W2 = Interpolation between 1 and W1)

FIG. 10

| Angle | Weight |
|---|---|
| +30° | 0.63 |
| +25° | 0.77 |
| +20° | 0.88 |
| +15° | 0.95 |
| +10° | 0.9 |
| +5° | 1 |
| 0° | 1 |

OPTICAL COMPENSATING SYSTEM AND METHOD

CROSS-REFERENCE TO RELATED APPLICATION

This application claims priority to Korean Patent Application No. 10-2023-0010927, filed in the Republic of Korea on Jan. 27, 2023, the entire disclosure of which is hereby expressly incorporated by reference into the present application.

BACKGROUND

Field

Embodiments of the disclosure relate to an optical compensating system and method, and to an optical compensating system and method capable of enhancing the accuracy of compensation data for a curved display panel.

Discussion of Related Art

With the development of the information society, various needs for display devices that display images are increasing, and various types of display devices, such as liquid crystal displays, organic light emitting displays, etc., are being utilized.

Among these display devices, the organic light emitting display device uses self-emissive organic light emitting diodes, providing advantages, such as a fast response and better contrast ratio, luminous efficiency, luminance, and viewing angle.

The organic light emitting display device can include organic light emitting diodes respectively arranged in a plurality of subpixels disposed on a display panel and cause each subpixel to emit light by controlling the driving current flowing to the organic light emitting diode to display images.

In some cases, the subpixels formed in the display device may not have uniform luminance due to various reasons. For example, the luminance uniformity of the display device can vary due to process variations in the display panel, variations in the electrical characteristics of the driving transistors that control the subpixels, variations in the driving voltage applied to the subpixels, and variations in the degradation of the light emitting elements that comprise the subpixels.

To compensate for the luminance deviation, compensation data for each subpixel can be generated from the captured image of the display panel, and the compensation data can be applied when supplying data voltages to the display panel in order to reduce the luminance deviation between the subpixels and improve the luminance uniformity.

Therefore, in those devices, accurate compensation data need to be generated to reduce the luminance deviation of the display panel and enhance image quality.

However, in a display panel with a curved structure bendable at a certain curvature, luminance intensity can be changed due to light reflection in the curved area or a focal mismatch between the flat area and the curved area. This can cause an error or issue in compensation data when generating an image photographed by a camera associated with the display panel.

BRIEF SUMMARY OF THE DISCLOSURE

Accordingly, the inventors of the disclosure have invented an optical compensating system and method capable of enhancing the accuracy of compensation data for a curved display panel.

Embodiments of the disclosure can provide an optical compensating system and method capable of enhancing the accuracy of compensation data according to the position by applying an image deviation between the flat state and curved state of the display panel.

Embodiments of the disclosure can provide an optical compensating system and method capable of enhancing the accuracy of compensation data according to the position by applying the weight according to the curvature of the curved area in the curved display panel.

Embodiments of the disclosure can provide an optical compensating method comprising generating initial flat data for a display panel in a flat state displaying a test image, generating initial curve data for the display panel in a curved state displaying the test image, extracting point data for a plurality of points in the initial flat data and the initial curve data, generating deviation data using the point data, generating a curve data map by applying a weight according to a curvature at each point to the deviation data, generating final curve data by applying the curve data map to the initial curve data, and generating compensation data from the final curve data.

Embodiments of the disclosure can provide an optical compensating device comprising a camera configured to generate a photographed image for a display panel displaying a test image, a data converting module configured to convert a flat photographed image and a curve photographed image respectively into initial flat data and initial curve data, a deviation data generating module configured to generate deviation data for the initial flat data and the initial curve data, a curve data map generating module configured to generate a curve data map by applying a weight according to a curvature of the display panel to the deviation data, a final curve data generating module configured to generate final curve data by applying the curve data map to the initial curve data, and a compensation data generating module configured to generate compensation data using the final curve data.

Embodiments of the disclosure can provide a display device comprising a display panel including a plurality of subpixels having a light emitting element, a gate driving circuit configured to supply a plurality of scan signals to the display panel, a data driving circuit configured to supply a data voltage to the display panel, a memory configured to store compensation data, and a timing controller configured to compensate for the data voltage using the compensation data, wherein the compensation data is generated by generating initial flat data for the display panel in a flat state displaying a test image, generating initial curve data for the display panel in a curved state displaying the test image, extracting point data for a plurality of points in the initial flat data and the initial curve data, generating deviation data using the point data, generating a curve data map by applying a weight according to a curvature at each point to the deviation data, generating final curve data by applying the curve data map to the initial curve data, and generating compensation data from the final curve data.

According to embodiments of the disclosure, it is possible to enhance the accuracy of compensation data for a curved display panel.

According to embodiments of the disclosure, it is possible to enhance the accuracy of compensation data according to the position by applying an image deviation between the flat state and curved state of the display panel.

According to embodiments of the disclosure, it is possible to enhance the accuracy of compensation data according to the position by applying the weight according to the curvature of the curved area in the curved display panel.

BRIEF DESCRIPTION OF THE DRAWINGS

The above and other objects, features, and advantages of the disclosure will be more clearly understood from the following detailed description, taken in conjunction with the accompanying drawings, in which:

FIG. 10 is a view illustrating an example weight table according to the curvature in an optical compensating method according to embodiments of the disclosure;

DETAILED DESCRIPTION OF THE EMBODIMENTS

Figure 1:
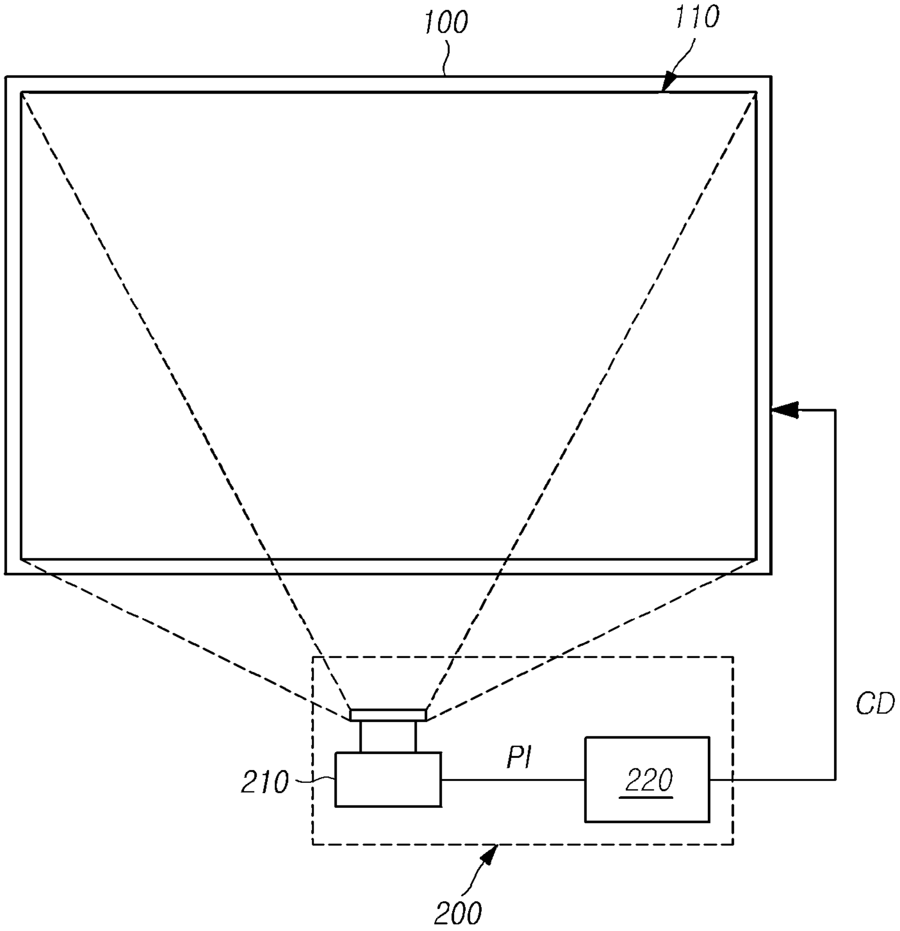
FIG. 1 is a view schematically illustrating an optical compensating system according to embodiments of the disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description can make the subject matter in some embodiments of the disclosure rather unclear. The terms such as “comprising”, “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “may” fully encompasses all the meanings of the term “can”.

Hereinafter, various embodiments of the disclosure will be described in detail with reference to the accompanying drawings. All the components of each optical compensating system and each display device according to all embodiments of the disclosure are operatively coupled and configured.

FIG. 1 is a view schematically illustrating an optical compensating system according to embodiments of the disclosure.

Referring to FIG. 1, the optical compensating system according to embodiments of the disclosure can include a display device 100 and an optical compensating device 200. The display device 100 includes a display panel 110 and other components such as a power supply, etc. the display device 100 can be any type of display device such as a bendable display, a flexible display, a rollable display, a curved display, etc.

The display device 100 is a device that displays an image through the display panel 110, and can be various types of devices, such as a liquid crystal display (LCD) and an organic light emitting display (OLED).

The optical compensating device 200 can include a camera 210 for photographing the display panel 110 constituting the display device 100 to generate photographed images PI, and a compensation data processing unit 220 for generating compensation data CD using the photographed images PI generated by the camera 210.

In an example, ® camera 210 can photograph the display panel 110 and generate a photographed image PI of a surface of the display panel 110. For instance, the optical compensating device 200 can display a test image including a plurality of dot-shaped calibration points in a black or white background color on the display panel 110 and photograph the display panel 110 to generate a photographed image PI.

The photographed image PI generated by the camera 210 can include luminance information about a plurality of subpixels SP formed on the display panel 110, which can be sent to the compensation data processing unit 220.

The compensation data processing unit 220 extracts luminance data according to the position of the display panel 110 based on the photographed image PI generated by the camera 210, and generates compensation data CD capable of compensating for it.

The display device 100 can enhance image quality by compensating for the data voltage(s) supplied to the display panel 110 based on the compensation data CD provided from the optical compensating device 200.

Figure 2:
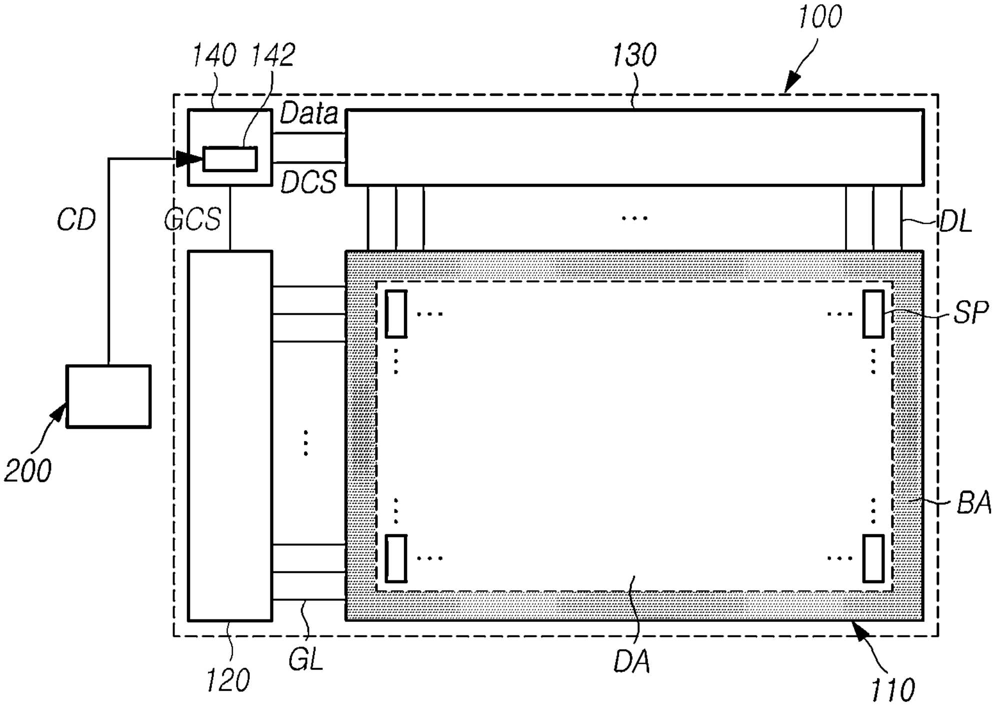
FIG. 2 is a view schematically illustrating the concept of displaying an image using compensation data of an optical compensating device by a display device in an optical compensating system according to embodiments of the disclosure.

FIG. 2 is a view schematically illustrating the concept of displaying an image using compensation data of an optical compensating device by a display device in an optical compensating system according to embodiments of the disclosure. The display device of FIG. 1 can be applied as the display device of FIG. 2.

Referring to FIG. 2, in an optical compensating system according to embodiments of the disclosure, a display device 100 can include a display panel 110 and a driving circuit for driving the display panel 110.

The display panel 110 can include a display area DA in which images are displayed and a bezel area BA in which no image is displayed. The bezel area BA can also be referred to as a non-display area or a non-active area, which can include a pad area, a repair area, etc.

The display panel 110 can include a plurality of subpixels SP for displaying images. For example, the plurality of subpixels SP can be disposed in the display area DA. In some cases, at least one subpixel SP can be disposed in the bezel area BA. At least one subpixel SP disposed in the bezel area BA is also referred to as a dummy subpixel.

The display panel 110 can include a plurality of signal lines for driving the plurality of subpixels SP. For example, the plurality of signal lines can include a plurality of data lines DL and a plurality of gate lines GL. The signal lines can further include other signal lines than the plurality of data lines DL and the plurality of gate lines GL according to the structure of the subpixel SP. For example, the other signal lines can include driving voltage lines and reference voltage lines.

For example, when one pixel in the display device 100 having a resolution of 2,208×2,752 includes three subpixels SP of r®(R), green (G), and blue (B), there can be provided 2,208 gate lines GL and a total of 8,256 (=2,752×3) data lines DL (2,752 data lines DL connected to each of three subpixels RGB), and the subpixel SP can be disposed at the intersection between the gate line GL and the data line DL.

The plurality of data lines DL and the plurality of gate lines GL can cross each other. Each of the plurality of data lines DL can be disposed while extending in a first direction. Each of the plurality of gate lines GL can be disposed while extending in a second direction. Here, the first direction can be a column direction and the second direction can be a row direction. In the disclosure, the column direction and the row direction are relative. For example, the column direction can be a vertical direction and the row direction can be a horizontal direction. As another example, the column direction can be a horizontal direction and the row direction can be a vertical direction. The first and second directions can be different directions crossing each other, and can form an angle equal to or less than 90 degrees.

The driving circuit can include a data driving circuit 130 for driving the plurality of data lines DL and a gate driving circuit 120 for driving the plurality of gate lines GL. The driving circuit can further include a timing controller 140 for controlling the data driving circuit 130 and the gate driving circuit 120.

The data driving circuit 130 is a circuit for driving the plurality of data lines DL, and can output data signals (also referred to as data voltages) corresponding to image signals to the plurality of data lines DL. The gate driving circuit 120 is a circuit for driving the plurality of gate lines GL and can generate gate signals, and output the gate signals to the plurality of gate lines GL. The gate signal can include one or more scan signals and light emission signals.

The timing controller 140 can start a scan according to the timing implemented in each frame and can control data driving at an appropriate time according to the scan. The timing controller 140 can convert the image signal input from an external host system into image data Data according to the data signal format used in the data driving circuit 130 and supply it to the data driving circuit 130.

The timing controller 140 can include a memory 142. The memory 142 can be positioned outside the timing controller 140, but in the example, the memory 142 can be positioned inside the timing controller 140. The memory 142 can store compensation data CD transferred from the optical compensating device 200 (e.g., from the compensation data processing unit 220 in FIG. 1).

Accordingly, the timing controller 140 converts the image signal input from the host system into image data by reflecting the compensation data CD stored in the memory 142. Therefore, the data signal supplied to the display panel 110 through the data driving circuit 130 can reflect the luminance deviation of the display panel 110, so that the quality of the image displayed through the display panel 110 can be enhanced.

Further, the timing controller 140 can receive display driving control signals from the external host system. For example, the display driving control signals can include a vertical synchronizing signal, a horizontal synchronizing signal, an input data enable signal, a clock signal, etc.

The timing controller 140 can generate the data driving control signal DCS and the gate driving control signal GCS based on display driving control signals input from the host system. The timing controller 140 can control the driving operation and driving timing of the data driving circuit 130 by supplying the data driving control signal DCS to the data driving circuit 130. The timing controller 140 can control the driving operation and driving timing of the gate driving circuit 120 by supplying the gate driving control signal GCS to the gate driving circuit 120.

The data driving circuit 130 can include one or more source driving integrated circuits SDIC. Each source driving integrated circuit can include a shift register, a latch circuit, a digital to analog converter (DAC), an output buffer, and the like. In some cases, each source driving integrated circuit can further include an analog to digital converter (ADC).

For example, each source driving integrated circuit can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

The gate driving circuit 120 can output a gate signal of a turn-on level voltage or a gate signal of a turn-off level voltage according to the control of the timing controller 140. The gate driving circuit 120 can sequentially drive the plurality of gate lines GL by sequentially supplying gate signals of the turn-on level voltage to the plurality of gate lines GL.

The gate driving circuit 120 can include one or more gate driving integrated circuits GDIC.

The gate driving circuit 120 can be connected with the display panel 110 by a TAB method or connected to a bonding pad of the display panel 110 by a COG or COP method or can be connected with the display panel 110 according to a COF method. Alternatively, the gate driving circuit 120 can be formed, in a gate in panel (GIP) type, in the bezel area BA of the display panel 110. The gate driving circuit 120 can be disposed on the substrate or can be connected to the substrate. In other words, the gate driving circuit 120 that is of a GIP type can be disposed in the bezel area BA of the substrate. The gate driving circuit 120 that is of a chip-on-glass (COG) type or chip-on-film (COF) type can be connected to the substrate.

Meanwhile, at least one of the data driving circuit 130 and the gate driving circuit 120 can be disposed in the display area DA. For example, at least one of the data driving circuit 130 and the gate driving circuit 120 can be disposed not to overlap the subpixels SP or to overlap all or some of the subpixels SP.

The data driving circuit 130 can be connected to one side (e.g., an upper or lower side) of the display panel 110. Depending on the driving scheme or the panel design scheme, the data driving circuit 130 can be connected with both sides (e.g., upper and lower sides) of the self-emission display panel 110, or two or more of the four sides of the self-emission display panel 110.

The gate driving circuit 120 can be connected with one side (e.g., a left or right side) of the display panel 110. Depending on the driving scheme or the panel design scheme, the gate driving circuit 120 can be connected with both sides (e.g., left and right sides) of the display panel 110, or two or more of the four sides of the display panel 110.

The timing controller 140 can be implemented as a separate component from the data driving circuit 130, or the timing controller 140 and the data driving circuit 130 can be integrated into an integrated circuit (IC). The timing controller 140 can be a controller used in typical display technology or a control device that can perform other control functions as well as the functions of the timing controller, or a circuit in the control device. The timing controller 140 can be implemented as various circuits or electronic components, such as an integrated circuit (IC), a field programmable gate array (FPGA), an application specific integrated circuit (ASIC), or a processor.

The timing controller 140 can be mounted on a printed circuit board or a flexible printed circuit and can be electrically connected with the data driving circuit 130 and the gate driving circuit 120 through the printed circuit board or the flexible printed circuit. The timing controller 140 can transmit/receive signals to/from the data driving circuit 130 according to one or more predetermined interfaces. The interface can include, e.g., a low voltage differential signaling (LVDS) interface, an EPI interface, and a serial peripheral interface (SP).

The display device 100 according to embodiments of the disclosure can be a self-emissive display device in which the display panel 110 emits light by itself. When the display device 100 according to the embodiments of the disclosure is a self-emissive display device, each of the plurality of subpixels SP can include a light emitting element. For example, the display device 100 according to embodiments of the disclosure can be an organic light emitting diode display in which the light emitting element is implemented as an organic light emitting diode (OLED).

As another example, the display device 100 according to embodiments of the disclosure can be an inorganic light emitting display device in which the light emitting element is implemented as an inorganic material-based light emitting diode. As another example, the display device 100 according to embodiments of the disclosure can be a quantum dot display device in which the light emitting element is implemented as a quantum dot which is self-emission semiconductor crystal.

In this case, if the display panel has a curved structure, an error may occur in the compensation data CD generated from the photographed image PI due to a difference in luminance intensity between the curved area having an arbitrary curvature and the flat area.

Figure 3:
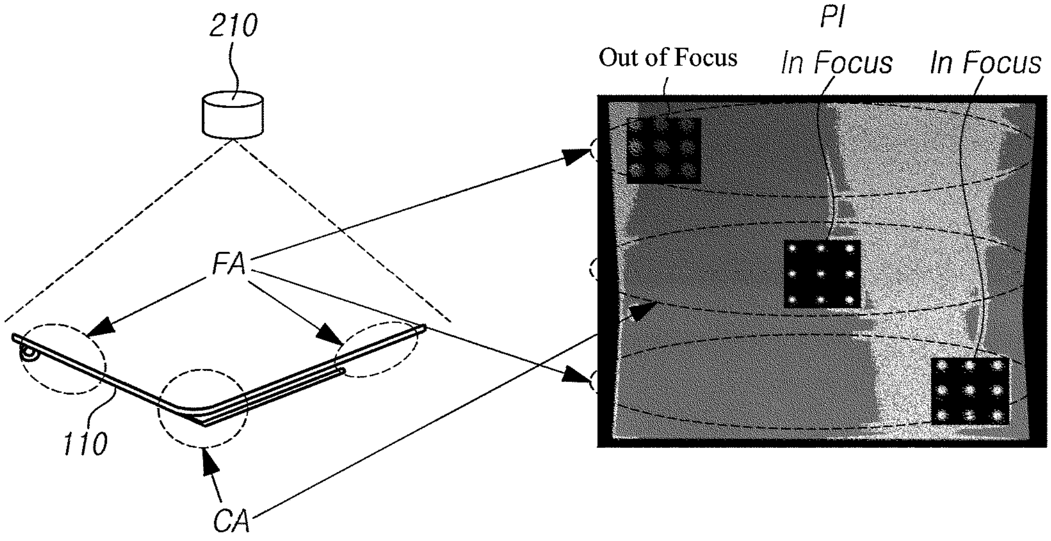
FIG. 3 is a view illustrating an example of photographing a curved display panel with a camera and an example photographed image for the curved display panel.

FIG. 3 is a view illustrating an example of photographing a curved display panel with a camera and an example photographed image for the curved display panel.

Referring to (a) of FIG. 3, in the optical compensating device 200, upon photographing the display panel 110 including the flat area FA and the curved area CA, the camera 210 focuses on the curved area CA which is far away.

If the camera 210 photographs the curved area CA as focused, the curved area CA which is in focus has high luminance intensity in the photographed image PI while the flat area FA can be defocused (or out of focus) and thus has low luminance intensity.

Further, if the display panel 110 is irradiated with light to photograph with the camera 210, the luminance intensity of the curved area CA is increased by the light reflected by the curved area CA.

As such, since a luminance deviation can occur between the curved area CA and the flat area FA of the photographed image PI due to the light reflected by the curved area CA and defocusing (e.g., being out of focus) of the camera 210, an error can exist in the compensation data CD as shown in (b) of FIG. 3.

The optical compensating system of the disclosure can enhance the accuracy of the compensation data CD according to the position for the curved display panel 110 including a predetermined curved area.

Figure 4:
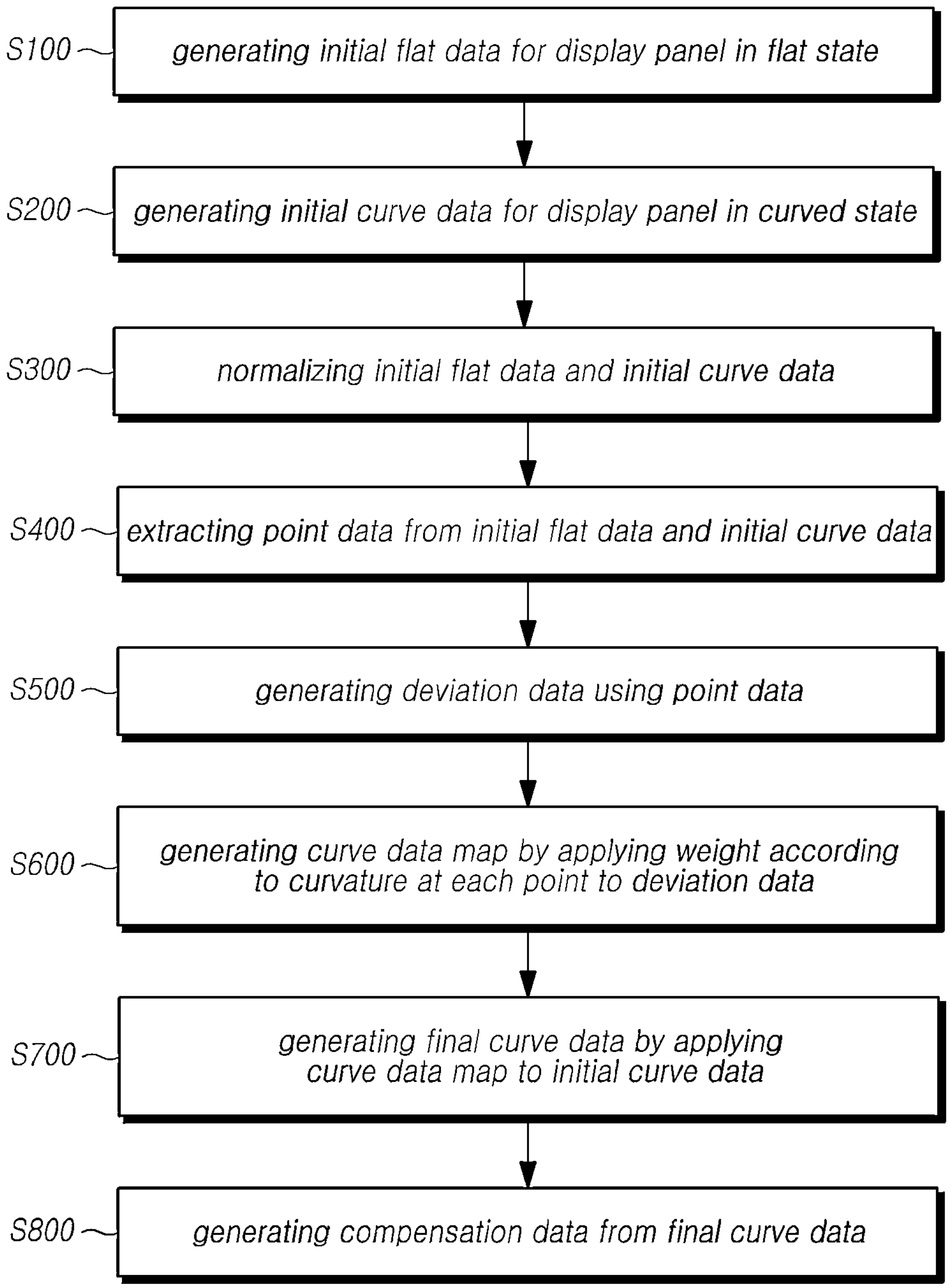
FIG. 4 is a flowchart illustrating an optical compensating method according to embodiments of the disclosure.

FIG. 4 is a flowchart illustrating an optical compensating method according to embodiments of the disclosure.

Referring to FIG. 4, an optical compensating method according to embodiments of the disclosure can include a step S100 of generating initial flat data for a display panel 110 being in a flat state (e.g., in a non-curved or not-bent state), a step S200 of generating initial curve data for the display panel 110 being in a curved state (e.g., in a bent state), a step S300 of normalizing the initial flat data and the initial curve data, a step S400 of extracting point data from the initial flat data and the initial curve data, a step S500 of generating deviation data using the point data, a step S600 of generating a curve data map by applying weights according to curvature at each point to the deviation data, a step S700 of generating final curve data by applying the curve data map to the initial curve data, and a step S800 of generating compensation data CD from the final curve data.

The step S100 of generating the initial flat data for the display panel 110 when the display panel 110 is in the flat state includes the step of generating a photographed image PI by photographing the display panel 110 manufactured or being in the flat state and converting it into initial flat data. Here, the flat state is when the display panel 110 is not bent or curved, or when the entire display panel 110 is flat.

The step S200 of generating the initial curve data for the display panel 110 when the display panel 110 is in the curved state includes the step of deforming the display panel 110 into a curved state by bending the display panel 110 from being in the flat state into a designated position at a designated curvature (e.g., flexing or curving the display panel 110) and converting the photographed image PI, which is photographed therefor, into initial flat data.

Figure 5:
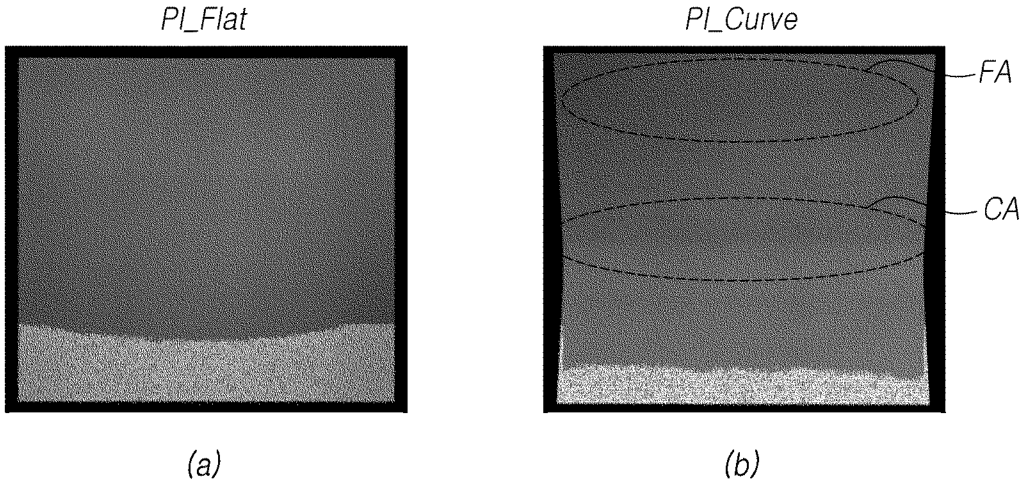
FIG. 5 is a view illustrating an example photographed image generated for a display panel in a flat state and a curved state in an optical compensating method according to embodiments of the disclosure.
Figure 6:
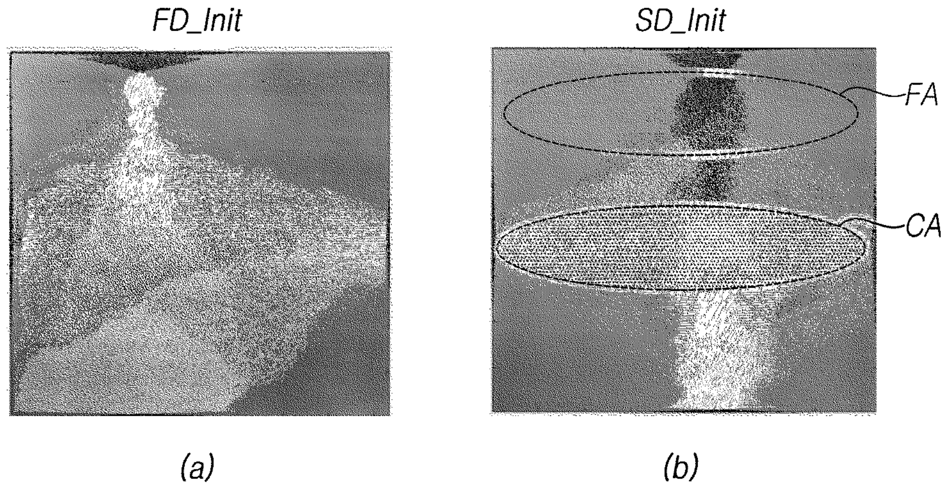
FIG. 6 is a view illustrating an example of initial flat data and initial curve data into which a flat photographed image and a curve photographed image are converted, in an optical compensating method according to embodiments of the disclosure.

FIG. 5 is a view illustrating examples of a flat photographed image generated for the display panel being in the flat state and a curve photographed image generated for the display panel being in the curved state in an optical compensating method according to embodiments of the disclosure. FIG. 6 is a view illustrating example initial flat data and initial curve data generated respectively based on the flat photographed image and the curve photographed image obtained by the camera.

Referring to (a) of FIG. 5, in the optical compensating method according to embodiments of the disclosure, the optical compensating device 200 generates a flat photographed image PI_Flat by photographing the display panel 110 in the flat state using the camera 210. The flat photographed image PI_Flat generated through the camera 210 is then transferred to the compensation data processing unit 220, and the compensation data processing unit 220 converts the flat photographed image PI_Flat into initial flat data FD_Init which is internally processable, as shown in (a) of FIG. 6.

Further, in the optical compensating method according to embodiments of the disclosure, as shown in (b) of FIG. 5, the optical compensating device 200 generates a curve photographed image PI_Curve by photographing the display panel 110 in the curved state, bent at a designated curvature in a designated position, using the camera 210. In this case, the curve photographed image PI_Curve exhibits a luminance deviation between the curved area CA and the flat area FA due to the light reflected by the curved area CA and defocusing of the camera 210 for the flat area FA and the curved area CA.

The curve photographed image PI_Curve generated through the camera 210 is then transferred to the compensation data processing unit 220, and the compensation data processing unit 220 converts the curve photographed image PI_Curve into initial curve data SD_Init which is internally processable, as shown in (b) of FIG. 6.

In this case, the luminance deviation is represented as a color by the curve photographed image PI_Curve having the luminance deviation between the curved area CA and the flat area FA in the initial curve data SD_Init.

The step S300 of normalizing the initial flat data FD_Init and the initial curve data SD_Init includes the step of processing the initial flat data FD_Init and the initial curve data SD_Init in the same range of distribution so as to process data in the same range. For example, when the initial flat data FD_Init and the initial curve data SD_Init have 255 grayscales of luminance, the initial flat data FD_Init and the initial curve data SD_Init can be divided by 256 to be normalized into a distribution between 0 and 1. In this case, the step S300 of normalizing the initial flat data FD_Init and the initial curve data SD_Init can be omitted.

The step S400 of extracting the point data from the initial flat data FD_Init and the initial curve data SD_Init includes the step of extracting data at some points of the entire display panel 110 to increase the efficiency of data processing and remove noise.

Figure 7:
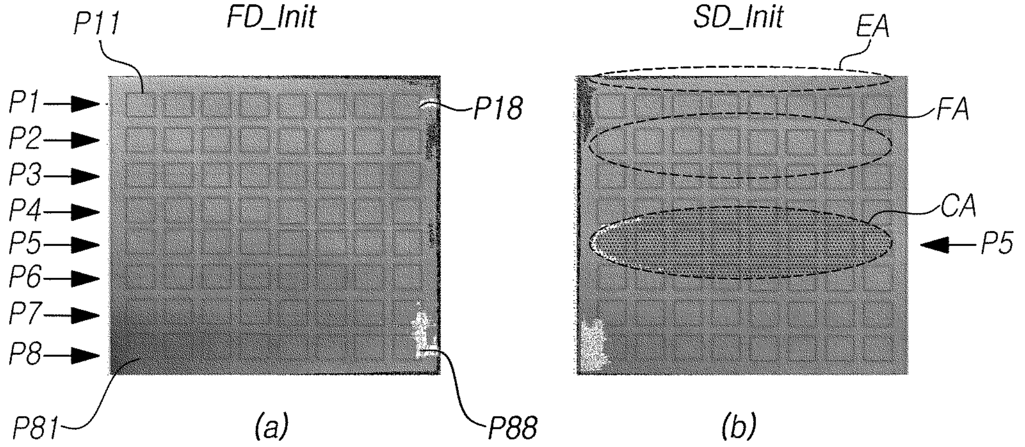
FIG. 7 is a view illustrating an example process of extracting point data from initial flat data and initial curve data in an optical compensating method according to embodiments of the disclosure.

FIG. 7 is a view illustrating an example process of extracting point data from initial flat data and initial curve data in an optical compensating method according to embodiments of the disclosure.

Referring to (a) and (b) of FIG. 7, the optical compensating method according to embodiments of the disclosure can designate points of an N×M matrix in the initial flat data FD_Init and the initial curve data SD_Init and extract point data therefrom, where N and M can be real numbers such as positive integers.

An example of extracting point data for the points of an 8×8 matrix is described here. In this case, the matrix points can include eight point lines P1 to P8 in the horizontal direction, and each point line P1 to P8 can include eight points. For example, a first point line P1 includes eight points from P11 to P18, and an eighth point line P8 includes points from P81 to P88.

When points of an 8×8 matrix are designated for the display panel 110 having a resolution of 2,208×2,752, the point spacing in the horizontal direction is 344 pixels, and the point spacing in the vertical direction is 276 pixels.

Meanwhile, since the edge area EA of the initial flat data FD_Init and initial curve data SD_Init corresponds to the boundary between the inside and outside of the display panel 110, it can appear as a high-frequency component with a high luminance data fluctuation. Accordingly, it is preferable to set the N×M matrix points as the inner area, not the edge area EA of the initial flat data FD_Init and initial curve data SD_Init, to eliminate the edge characteristics of the high-frequency component.

In this case, some of the N×M matrix points are positioned along the curved line of the display panel 110. For example, when the curved area CA is formed near the center of the display panel 110 along the horizontal direction, the fifth point line P5 in the horizontal direction among the N×M matrix points can correspond to the curved area CA of the display panel 110. In this case, a deviation arises between the luminance value displayed along the fifth point line P5 corresponding to the curved area CA and the luminance value displayed along the point line corresponding to the flat area FA.

The step S500 of generating the deviation data using the point data is the step of calculating the deviation at each point using the point data extracted from the initial flat data FD_Init and the initial curve data SD_Init.

Figure 8:
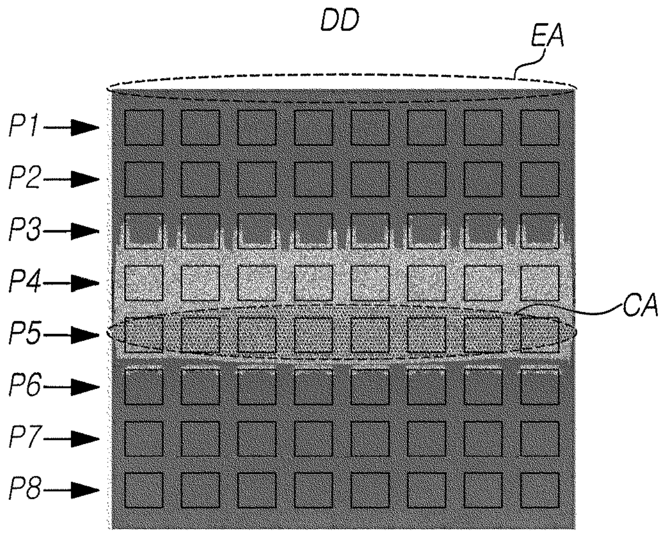
FIG. 8 is a view illustrating example deviation data generated using point data in an optical compensating method according to embodiments of the disclosure.

FIG. 8 is a view illustrating example deviation data generated using point data in an optical compensating method according to embodiments of the disclosure.

Referring to FIG. 8, the optical compensating method according to embodiments of the disclosure can generate the deviation data DD by comparing the point data of the initial flat data FD_Init and the point data of the initial curve data SD_Init corresponding to the same position.

For example, the deviation data DD can be generated by dividing the point data of the initial flat data FD_Init by the point data of the initial curve data SD_Init. Or, the deviation data DD can be generated by dividing the point data of the initial curve data SD_Init by the point data of the initial flat data FD_Init.

Accordingly, the deviation data DD reflects the deviation between the initial flat data FD_Init and the initial curve data SD_Init for the N×M matrix points.

As described above, the high-frequency component of the edge area EA can be removed by setting the N×M matrix points in the inner area of the initial flat data FD_Init and the initial curve data SD_Init.

The step S600 of generating a curve data map by applying weights according to curvature of each point to the deviation data DD is the step of adjusting the deviation between the initial flat data FD_Init and the initial curve data SD_Init according to the curvature at each point.

Figure 9:
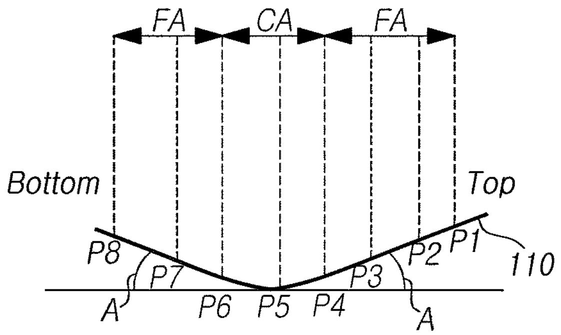
FIG. 9 is a view illustrating a process of generating a curve data map by applying a weight according to curvature to deviation data in an optical compensating method according to embodiments of the disclosure.
Figure 9:
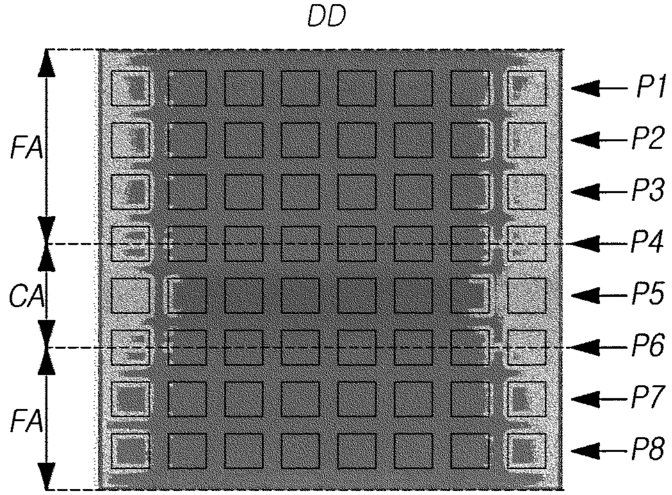

FIG. 9 is a view illustrating a process of generating a curve data map by applying a weight according to curvature to deviation data in an optical compensating method according to embodiments of the disclosure. FIG. 10 is a view illustrating a weight table according to curvature.

Referring to FIGS. 9 and 10, the optical compensating method according to embodiments of the disclosure can designate points of an N×M matrix on the initial curve data SD_Init and extract point data therefrom. For example, the matrix points can include eight point lines P1 to P8 in the horizontal direction, and each point line P1 to P8 can include eight points.

As such, when eight point lines P1 to P8 are disposed, some point lines can be formed in a position corresponding to the curved area CA of the display panel 110. An example in which a fourth point line P4, a fifth point line P5, and a sixth point line P6 are formed in the position corresponding to the curved area CA is shown here.

The other area than the curved area CA can be regarded as the flat area FA. Here, the areas between the first point line P1 to the fourth point line P4 and the areas between the sixth point line P6 and the eighth point line P8 correspond to the flat area FA.

In this case, any point of the display panel 110 can have a different weight to be applied to the deviation data DD depending on the bending angle A which corresponds to the curvature. For example, with the largest-curvature area (the fifth point line P5 in the example) of the curved area CA of the display panel 110 set as a reference line, the weight to be applied to the deviation data DD can be varied depending on the bending angle A which is formed by the curved area CA and the flat area FA.

In this case, the bending angle A which is formed by a specific point line can be determined according to the horizontal distance and vertical distance from the fifth point line P5 which corresponds to the reference line. For example, the bending angle of the fifth point line P6 corresponds to tan A which is the value produced by dividing the vertical distance between the sixth point line P6 and the fifth point line P5 by the horizontal distance between the sixth point line P6 and the fifth point line P5. Accordingly, the bending angle A of each point can be determined depending on the horizontal distance and vertical distance from the reference line.

When the weight when the display panel 110 is in the flat state is set as a reference weight of 1, the reference weight of 1 can be applied to the fifth point line P5 exhibiting the largest curvature, as the reference line. Further, as the bending angle A at any point increases, the vertical spacing between the curved area CA and the flat area FA increases. Thus, the weight applied to the deviation data DD can be set to decrease to a value smaller than 1.

In this case, in the area between the first point line P1 and the fourth point line P4 and the area between the sixth point line P6 and the eighth point line P8 corresponding to the flat area FA, the bending angle A does not change but remains constant, and thus, a fixed weight W1 can apply. Accordingly, the curve data map SDM(FA) for the flat area can be generated by applying the fixed weight W1 according to the bending angle A to the deviation data DD(FA) of the flat area.

For example, when the bending angle A of the display panel 110 is 20 degrees, the curve data map SDM(FA) of the flat area can be generated by applying the fixed weight W1 of 0.88 corresponding to the bending angle of 20 degrees to the deviation data DD(FA) for the flat area.

Meanwhile, the area between the fourth point line P4 and the sixth point line P6 corresponding to the curved area CA is an area where the bending angle A continuously changes. Accordingly, in the curved area CA, a variable weight W2 that varies depending on the position is applied to the deviation data DD.

In this case, since the bending angle A in the curved area CA is continuously varied, the variable weight W2 can be generated by interpolation between the fixed weight W1 and the reference weight (1).

Meanwhile, the edge area EA of the curve data map SDM(FA) can appear as a high-frequency component that has high luminance data fluctuations. Accordingly, a curve data map FSD can be generated by removing some of the data positioned in the edge area of the curve data map FSD and selecting only the data positioned inside so as to eliminate the edge characteristics of the high-frequency component.

The so-generated curve data map SDM reflects the curvature according to the position of the display panel 110 and can thus be applied to the initial curve data SD_Init to generate final curve data FSD that reflects the curvature.

The step S700 of generating the final curve data by applying the curve data map SDM to the initial curve data SD_Init is the step of generating the final curve data by reflecting the curvature according to the position of the display panel 110.

Figure 11:
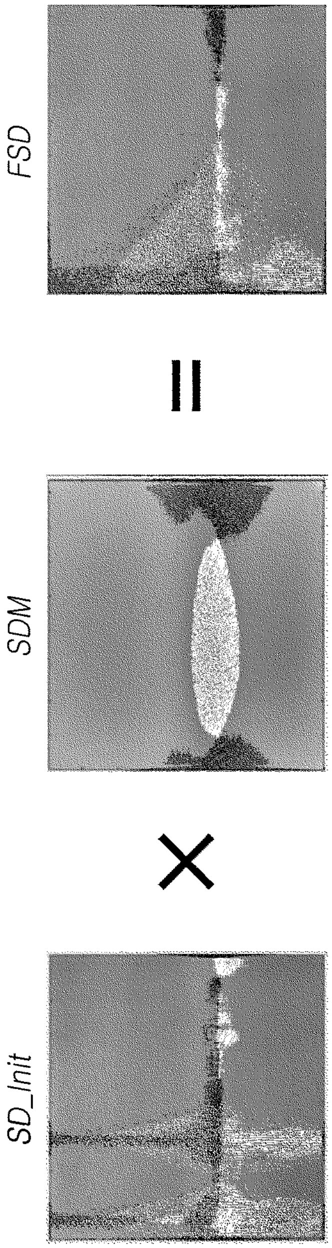
FIG. 11 is a view illustrating an example result of an experiment generating final curve data by applying a curve data map to initial curve data in an optical compensating method according to embodiments of the disclosure.

FIG. 11 is a view illustrating an example result of an experiment generating final curve data by applying a curve data map to initial curve data in an optical compensating method according to embodiments of the disclosure.

Referring to FIG. 11, the optical compensating method according to embodiments of the disclosure can generate the final curve data FSD that reflects the curvature of the display panel 110 by applying the curve data map SDM to the initial curve data SD_Init.

For example, the final curve data FSD can be generated by multiplying the curve data map SDM to the initial curve data SD_Init.

It can be identified that the luminance deviation due to the curved area CA in the central portion is reduced as the so-generated final curve data FSD is compared with the initial curve data SD_Init.

The step S800 of generating the compensation data CD from the final curve data FSD is the step of generating the compensation data CD used in the display device 100 using the final curve data FSD.

The compensation data CD can be generated as a value for compensating for the deviation between the final curve data FSD and the test image applied to the display panel 110 to generate the photographed image PI.

Meanwhile, the compensation data CD can be generated two or more times depending on the grayscale of the test image.

For example, when the display panel 110 is represent in 255 grayscales, two compensation data CD can be used by generating one for a low-grayscale test image of 40 grayscale or less, and the other for a high-grayscale test image of 150 grayscale or more. In this case, the memory 142 of the display device 100 can store low-grayscale compensation data and high-grayscale compensation data and apply different compensation data CD depending on the grayscale of the video image displayed on the display panel 110.

Figure 12:
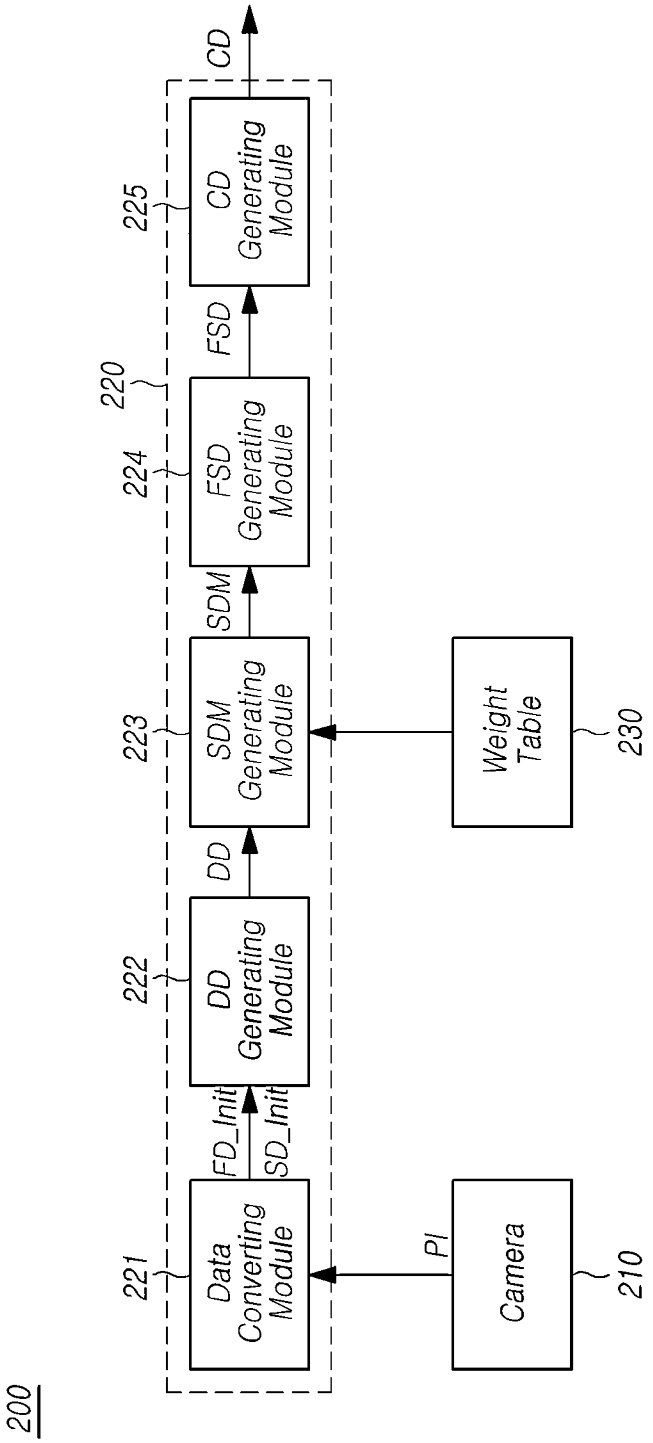
FIG. 12 is a block diagram illustrating an optical compensating device according to embodiments of the disclosure.

FIG. 12 is a block diagram illustrating an optical compensating device according to embodiments of the disclosure.

Referring to FIG. 12, an optical compensating device 200 according to embodiments of the disclosure can include a camera 210, a compensation data processing unit 220, and a weight table 230.

The camera 210 photographs the test image displayed on the display panel 110 of the display device 100, generating the photographed image PI.

For example, the optical compensating device 200 can provide a test image including a plurality of dot-shaped calibration points in a black or white test color to the display panel 110 and photograph the test image through the camera 210 to generate a photographed image PI.

In this case, the test image can be generated in the optical compensating device 200 and applied to the display device 100, or can be transferred to the display device from an external host system. When the test image is generated in the optical compensating device 200, the optical compensating device 200 can further include a test image generation module for generating the test image.

The photographed image PI can include luminance information about the plurality of subpixels SP disposed in the display area of the display panel 110.

The compensation data processing unit 220 can include a data converting module 221 that converts the flat photographed image PI_Flat and the curve photographed image PI_Curve into initial flat data FD_Init and initial curve data SD_Init, a deviation data generating module 222 that generates deviation data DD for the initial flat data FD_Init and the initial curve data SD_Init, a curve data map generating module 223 that generates a curve data map SDM by applying a weight according to curvature to the deviation data DD, a final curve data generating module 224 that generates final curve data FSD by applying the curve data map SDM to the initial curve data SD_Init, and a compensation data generating module 225 that generates compensation data CD.

The data converting module 221 converts the flat photographed image PI_Flat photographed in the flat state of the display panel 110 and the curve photographed image PI_Curve photographed in the curved state of the display panel 110 into initial flat data FD_Init and initial curve data SD_Init.

The deviation data generating module 222 normalizes the initial flat data FD_Init and the initial curve data SD_Init and generates deviation data DD using the point data extracted from N×M points.

The curve data map generating module 223 extracts the weight according to the curvature at each point from the weight table 230 and applies it to the deviation data DD, generating the curve data map SDM.

The final curve data generating module 224 generates the final curve data FSD by applying the curve data map SDM to the initial curve data SD_Init.

The compensation data generating module 225 generates compensation data CD using the final curve data FSD.

The optical compensating system of the disclosure can enhance the accuracy of the compensation data CD by generating compensation data CD reflecting the curvature according to the position, for the curved display panel 110 including a predetermined curved area CA.

Some aspects of the embodiments of the disclosure described above are briefly discussed below.

An optical compensating method according to embodiments of the disclosure can comprise generating initial flat data for a display panel in a flat state displaying a test image, generating initial curve data for the display panel in a curved state displaying the test image, extracting point data for a plurality of points in the initial flat data and the initial curve data, generating deviation data using the point data, generating a curve data map by applying a weight according to a curvature at each point to the deviation data, generating final curve data by applying the curve data map to the initial curve data, and generating compensation data from the final curve data.

The optical compensating method of the disclosure can further comprise normalizing the initial flat data and the initial curve data before extracting the point data.

The point data can be data extracted on N×M matrix points positioned on the initial flat data and the initial curve data.

The point data can be data extracted from an inner area except for an edge area in the initial flat data and the initial curve data.

Generating the deviation data can generate the deviation data by dividing the point data of the initial flat data by the point data of the initial curve data or generate the deviation data by dividing the point data of the initial curve data by the point data of the initial flat data.

Generating the curve data map can include applying a fixed weight according to a bending angle to deviation data of a flat area and applying a variable weight according to the bending angle to deviation data of a curved area.

The variable weight can be generated by applying interpolation between the fixed weight and a reference weight.

The reference weight can be for a point line with a maximum curvature.

Generating the curve data map can further include removing a portion of data positioned in an edge area.

Generating the final curve data can multiply the initial curve data by the curve data map.

Generating the compensation data can be generated as a value for compensating for a deviation between the test image and the final curve data.

The optical compensating method of the disclosure can further comprise supplying the test image to the display panel.

The compensation data can include first compensation data generated from a low-grayscale test image of 40 grayscale or less, and second compensation data generated from a high-grayscale test image of 150 grayscale or more.

An optical compensating device of the disclosure can comprise a camera generating a photographed image for a display panel displaying a test image, a data converting module converting a flat photographed image and a curve photographed image into initial flat data and initial curve data, a deviation data generating module generating deviation data for the initial flat data and the initial curve data, a curve data map generating module generating a curve data map by applying a weight according to a curvature of the display panel to the deviation data, a final curve data generating module generating final curve data by applying the curve data map to the initial curve data, and a compensation data generating module generating compensation data using the final curve data.

The optical compensating device of the disclosure can further comprise a test image generating module generating the test image and supplying the test image to the display panel.

The optical compensating device of the disclosure can further comprise a weight table storing weight data according to the curvature of the display panel.

A display device of the disclosure can comprise a display panel including a plurality of subpixels having a light emitting element, a gate driving circuit supplying a plurality of scan signals to the display panel, a data driving circuit supplying a data voltage to the display panel, a memory storing compensation data, and a timing controller compensating for the data voltage using the compensation data, wherein the compensation data is generated by generating initial flat data for the display panel in a flat state displaying a test image, generating initial curve data for the display panel in a curved state displaying the test image, extracting point data for a plurality of points in the initial flat data and the initial curve data, generating deviation data using the point data, generating a curve data map by applying a weight according to a curvature at each point to the deviation data, generating final curve data by applying the curve data map to the initial curve data, and generating compensation data from the final curve data.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure.

What is claimed:

1. An optical compensating method for a display panel, comprising:
   - generating initial flat data for the display panel when the display panel is in a flat state displaying a test image;
   - generating initial curve data for the display panel in a curved state displaying the test image;
   - extracting point data for a plurality of points in the initial flat data and the initial curve data;
   - generating deviation data using the point data;
   - generating a curve data map by applying weights according to curvatures at each point to the deviation data;
   - generating final curve data by applying the curve data map to the initial curve data; and
   - generating compensation data from the final curve data,
   - wherein the point data include data extracted from an inner area except for an edge area in the initial flat data and the initial curve data.

2. The optical compensating method of claim 1, further comprising normalizing the initial flat data and the initial curve data before extracting the point data.

3. The optical compensating method of claim 1, wherein the point data are data extracted on N×M matrix points positioned on the initial flat data and the initial curve data.

4. The optical compensating method of claim 1, wherein generating the deviation data generates the deviation data by dividing the point data of the initial flat data by the point data of the initial curve data, or generates the deviation data by dividing the point data of the initial curve data by the point data of the initial flat data.

5. The optical compensating method of claim 1, wherein generating the curve data map includes:
   - applying a fixed weight according to a bending angle to deviation data of a flat area; and
   - applying a variable weight according to the bending angle to deviation data of a curved area.

6. The optical compensating method of claim 5, wherein the variable weight is generated by applying interpolation between the fixed weight and a reference weight.

7. The optical compensating method of claim 6, wherein the reference weight is for a point line with a maximum curvature.

8. The optical compensating method of claim 5, wherein generating the curve data map further includes removing a portion of data positioned in an edge area.

9. The optical compensating method of claim 1, wherein generating the final curve data multiplies the initial curve data by the curve data map.

10. The optical compensating method of claim 1, wherein generating the compensation data generates a value for compensating of a deviation between the test image and the final curve data.

11. The optical compensating method of claim 10, further comprising supplying the test image to the display panel.

12. The optical compensating method of claim 1, wherein the compensation data includes:
   - first compensation data generated from a low-grayscale test image of 40 grayscale or less; and
   - second compensation data generated from a high-grayscale test image of 150 grayscale or more.

13. An optical compensating device, comprising:
   - a camera configured to generate a photographed image for a display panel displaying a test image;
   - a data converting module configured to convert a flat photographed image and a curve photographed image into initial flat data and initial curve data;
   - a deviation data generating module configured to generate deviation data for the initial flat data and the initial curve data using point data for a plurality of points;
   - a curve data map generating module configured to generate a curve data map by applying weights according to curvature at each point to the deviation data;
   - a final curve data generating module configured to generate final curve data by applying the curve data map to the initial curve data; and
   - a compensation data generating module configured to generate compensation data using the final curve data,
   - wherein the point data include data extracted from an inner area except for an edge area in the initial flat data and the initial curve data.

14. The optical compensating device of claim 13, further comprising a test image generating module configured to generate the test image and supplying the test image to the display panel.

15. The optical compensating device of claim 13, further comprising a weight table configured to store weight data according to the curvature of the display panel.

16. A display device, comprising:
   - a display panel including a plurality of subpixels having a light emitting element;
   - a gate driving circuit configured to supply a plurality of scan signals to the display panel;
   - a data driving circuit configured to supply a data voltage to the display panel;

a memory configured to store compensation data; and a timing controller configured to compensate for the data voltage using the compensation data, wherein the compensation data is generated by:

generating initial flat data for the display panel in a flat state displaying a test image;

generating initial curve data for the display panel in a curved state displaying the test image;

extracting point data for a plurality of points in the initial flat data and the initial curve data;

generating deviation data using the point data;

generating a curve data map by applying weights according to curvature at each point to the deviation data;

generating final curve data by applying the curve data map to the initial curve data; and generating compensation data from the final curve data, wherein the point data include data extracted from an inner area except for an edge area in the initial flat data and the initial curve data.

* * * * *